(12) United States Patent
Lin

(10) Patent No.: US 6,582,102 B2
(45) Date of Patent: Jun. 24, 2003

(54) FLUORESCENT LAMP CONNECTOR ADAPTER WITH CONVERSION CIRCUIT

(76) Inventor: Lee-Cheng Lin, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/897,943

(22) Filed: Jul. 5, 2001

(65) Prior Publication Data

US 2003/0007350 A1 Jan. 9, 2003

(51) Int. Cl.[7] .................................................. F21V 7/04
(52) U.S. Cl. ...................... 362/304; 362/221; 362/254; 362/260; 439/236; 439/620
(58) Field of Search ................................ 362/221, 254, 362/260, 304; 439/236, 620

(56) References Cited

U.S. PATENT DOCUMENTS

| | | | | |
|---|---|---|---|---|
| 3,953,761 A | * | 4/1976 | Giudice | 315/57 |
| 4,878,159 A | * | 10/1989 | Blaisdell et al. | 362/216 |
| 5,440,466 A | * | 8/1995 | Belisle et al. | 362/221 |
| 5,546,291 A | * | 8/1996 | Simes | 313/318.01 |
| 5,904,415 A | * | 5/1999 | Robertson et al. | 362/217 |
| 6,027,230 A | * | 2/2000 | Huber et al. | 362/226 |
| 6,168,289 B1 | * | 1/2001 | Shah | 313/331 |
| 6,376,991 B1 | * | 4/2002 | Sundaram et al. | 315/56 |

* cited by examiner

Primary Examiner—Sandra O'Shea
Assistant Examiner—Ismael Negron
(74) Attorney, Agent, or Firm—Troxell Law Office PLLC

(57) ABSTRACT

An electronically combined fluorescent light structure including two connecting seats with respective light tube sockets and terminals disposed at the front and the rear end of the connecting seats, an electronic starting circuit mounted inside the connecting seat, and a hollow reflecting plate inserted at the upper aspect of the two connecting seats to enable the connection among the electronic circuits by a guide wire disposed through the hollow reflecting plate. After the respective connections with the light tube sockets and the terminals, a fluorescent light unit is comprised. The terminals on the two sides of the fluorescent light unit are inserted into the traditional fluorescent light seat thereby achieving the function of turning on the light by electronic starting.

1 Claim, 5 Drawing Sheets

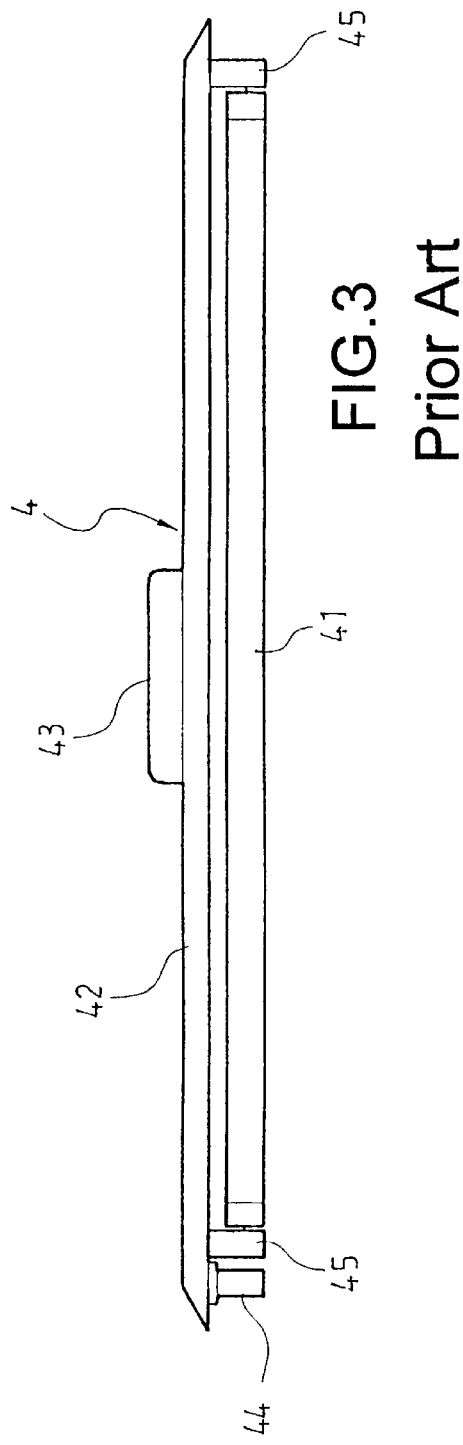
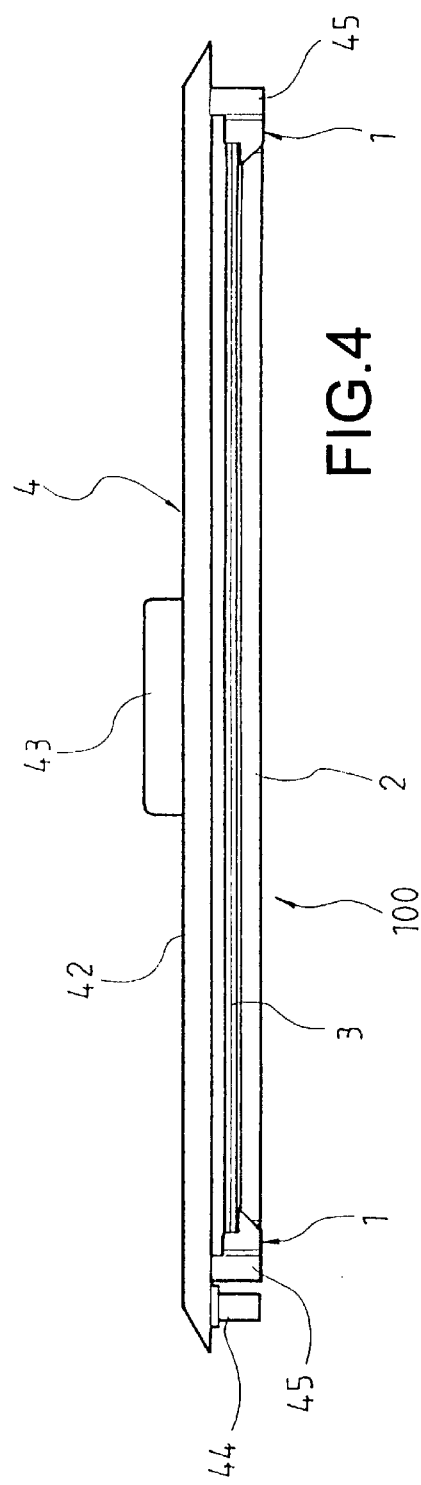

FLUORESCENT LAMP CONNECTOR ADAPTER WITH CONVERSION CIRCUIT

BACKGROUND OF THE INVENTION

1. Field of the Invention

The present invention relates to a fluorescent lamp connector adapter with conversion circuit, more especially a fluorescent light structure capable of being directly installed on an old electric inducted fluorescent light seat without dismantling the original light seat thereby providing illumination with a high electronic efficiency factor, to enhance the illumination efficiency and to save the energy.

2. Description of the Prior Art

A traditional fluorescent light is lighted by electric inductance, therefore it usually consumes energy, has lower power and lacks illumination efficiency. The traditional fluorescent light does not comply with the modern energy saving trend. Due to the advancement of the technology, a kind of fluorescent light assembled by an electronic stabilizer and illumination is available on the market, however, the price of this kind of fluorescent light is high. Additionally, the old light apparatus has to be dismantled first before installation, which is not only time consuming, but the dismantled light apparatus could be discarded in a careless manner causing environmental pollution. Based on the tremendous quantity of electrically induced old light apparatus used globally at present, the pollution being produced will be beyond estimation and that is not desirable. Since these shortcomings have long afflicted and troubled the manufacturers as well as the consumers, an electronically combined fluorescent light structure capable of increasing the efficiency and enhancing the practical value among such products is truly needed and is the motivation of the present invention.

SUMMARY OF THE INVENTION

Therefore, the primary objective of the present invention is to provide a fluorescent lamp connector adapter with conversion circuit to be directly installed on an old electrically induced fluorescent light seat to make the old light apparatus possess electronic illumination equipment that provides a high electronic efficiency factor without replacing the light seat, thereby preventing environmental pollution, and simplifying and quickening the replacement procedure.

The fluorescent lamp connector adapter with conversion circuit comprises two connecting seats, the front and the rear ends of the connecting seats are disposed with respective sockets for the insertion of a light tube and conducting terminals to be inserted to the old light seat.

The fluorescent lamp connector adapter with conversion circuit comprises an electronic starting circuit connected with a guide wire and further respectively connected with the sockets and the terminals.

The fluorescent lamp connector adapter with conversion circuit comprises a hollow reflecting plate for reflecting illumination. The reflecting plate is inserted at the upper aspect of the two connecting seats. The connecting guide wire of the electronic circuit is disposed through the reflecting plate.

The main features and the innovation of the present invention will be further understood by the brief description of the drawings and the detailed description of the preferred embodiments, shown below.

BRIEF DESCRIPTION OF THE DRAWINGS

FIG. 3 is a schematic drawing of the conventional fluorescent light and light seat.

FIG. 4 is a schematic drawing of a preferred embodiment of the present invention in use.

DETAILED DESCRIPTION OF THE PREFERRED EMBODIMENTS

Figure 1:
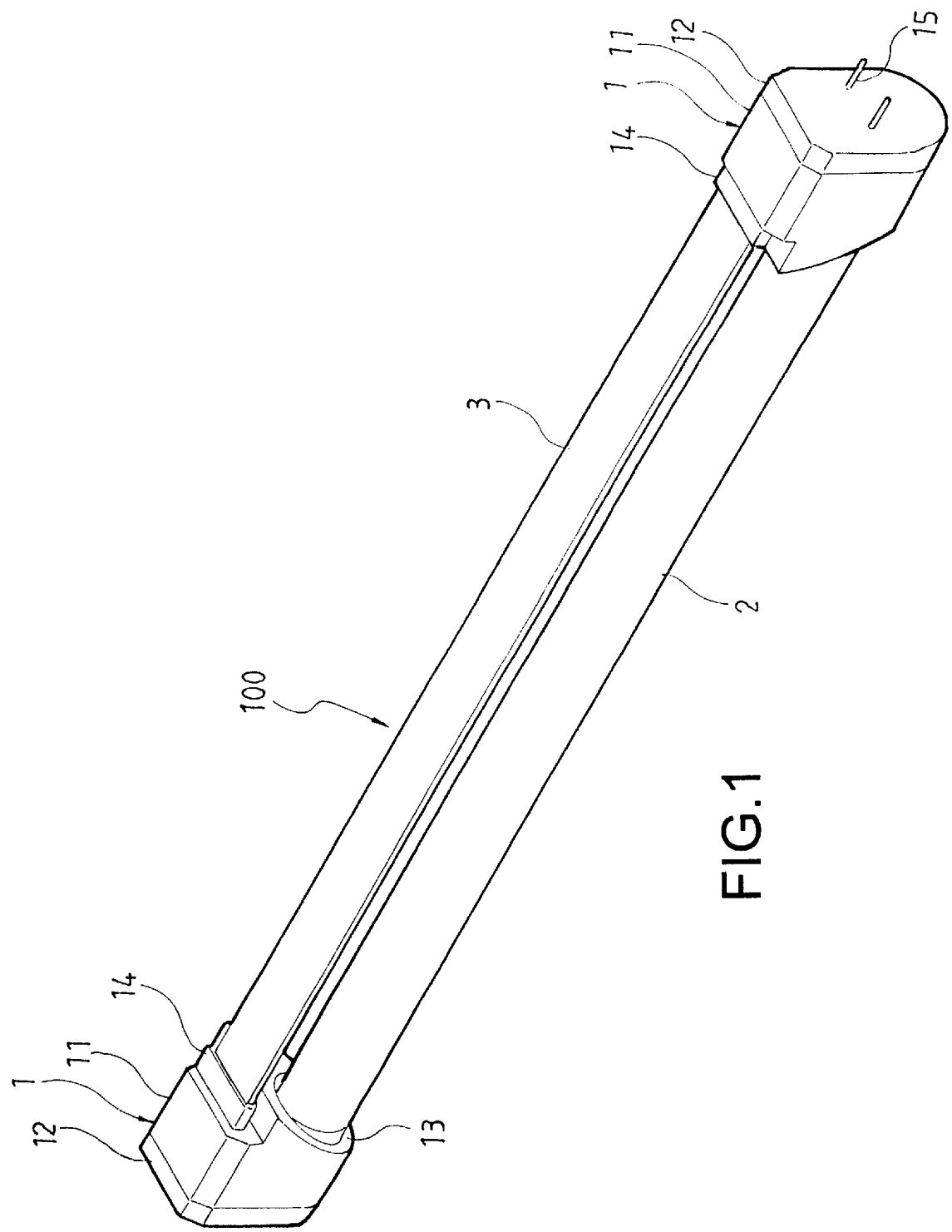
FIG. 1 is a pictorial and schematic drawing of the present invention.
Figure 2:
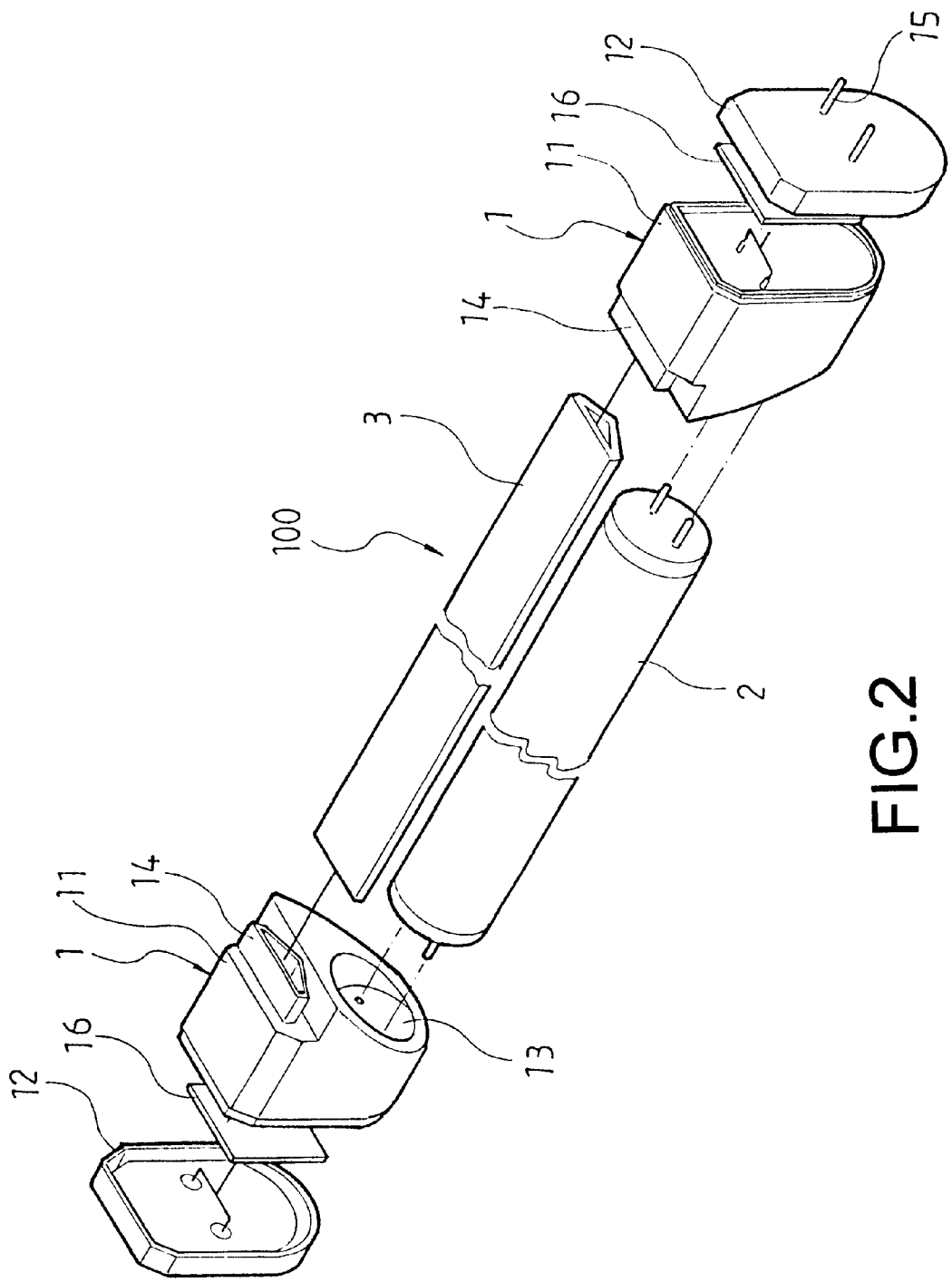
FIG. 2 is a pictorial, exploded and schematic drawing of the present invention.

Referring to FIGS. 1 and 2, the pictorial and schematic drawing as well as the pictorial, exploded and schematic drawing of the present invention, the present invention comprises two connecting seats (1). Each connecting seat (1) includes a front and a rear casing (11, 12). A socket (13) is disposed at the lower aspect of the front casing (11) of each connecting seat (1) for the insertion of a light tube (2) with a terminal at each end such that each terminal end of the light tube is connectively adjoined to one of the two sockets (13). An insert seat (14) in proximately triangular shape is mounted at the upper aspect of the socket (13). The rear casing (12) of each connecting seat is disposed with two terminals (15) corresponding to an insert hole seat of a conventional light seat to make the joint points of the said two terminals (15) connect with each other.

An electronic starting circuit (16) is disposed inside the front casing (11) to make the circuit (16) connect respectively with the socket (13) and the terminals (15). Then a hollow reflecting plate (3) in inverted triangular shape and slightly smaller than the insert seat (14) is inserted to the insert seat (14). The two connecting seats (1) are engaged with each other and two circuits (16) are connected by the guide wire disposed through the reflecting plate (3) so as to compose an electronic fluorescent light (100) after the housing of the front and the rear casings (11, 12).

Through the assembly of the mentioned components, the terminals (15) projecting at two ends of the said electronic fluorescent light (100) can be inserted into the sockets of the conventional light seat and can be conjoined with the original electrically induced current stabilizer via the electronic circuits (16) to compose the electronic fluorescent light (100) without dismantling the original fluorescent light seat thereby achieving the effectiveness of enhancing the power factor, illumination efficiency, and saving the energy.

Referring to FIGS. 3 and 4, the schematic drawing of the conventional fluorescent light and light seat as well as the schematic drawing of a preferred embodiment shows the present invention assembled with a light seat. During the installation of the present invention, the light tube (41) of the traditional electrically induced fluorescent light (4) is dismantled, however, the light seat (42), the electrically induced current stabilizer (43) at the upper aspect of the light seat (42), the starter (44) and the sockets (45) on the two sides at the lower aspect of the light seat (42) are reserved. As shown in FIG. 4, the corresponding terminals (15) projecting at the two ends of the connecting seats (1) of the electronic fluorescent light (100) of the present invention are inserted to the sockets (45) thereby replacing the old electrically induced fluorescent light (4) and composing the electronic fluorescent light (100). The installation is relative simple and rapid without replacing the original light seat (42) to prevent the environment pollution caused by discarding.

Figure 5:
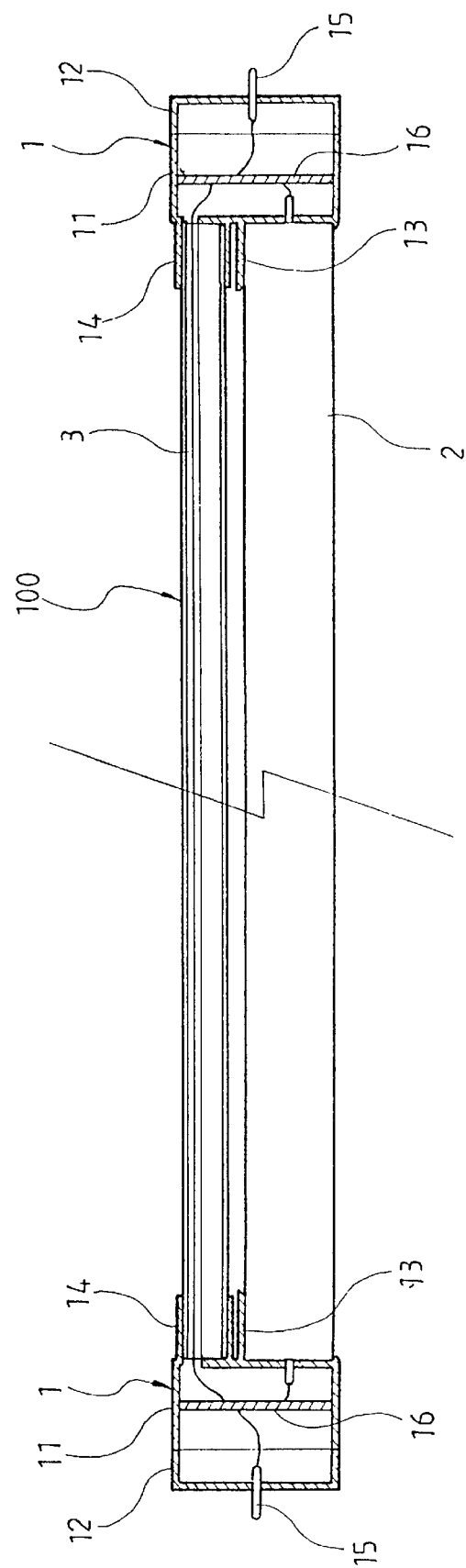
FIG. 5 is a cross-sectional and schematic drawing of the assembled present invention.

Referring to FIG. 5, the cross-sectional and schematic drawing of the assembled present invention, the electronic circuits (16) of the present invention are connected respectively with the sockets (13) and the terminals (15) of the light tube (2) at the connecting seats (1). The guide wire disposed through the reflecting plate (3) connects between the two electronic circuits (16) to form a loop allowing the traditional electrically induced fluorescent light (4) to be changed easily into the electronic fluorescent light (100) without dismantling the light seat (42).

Figure 6:
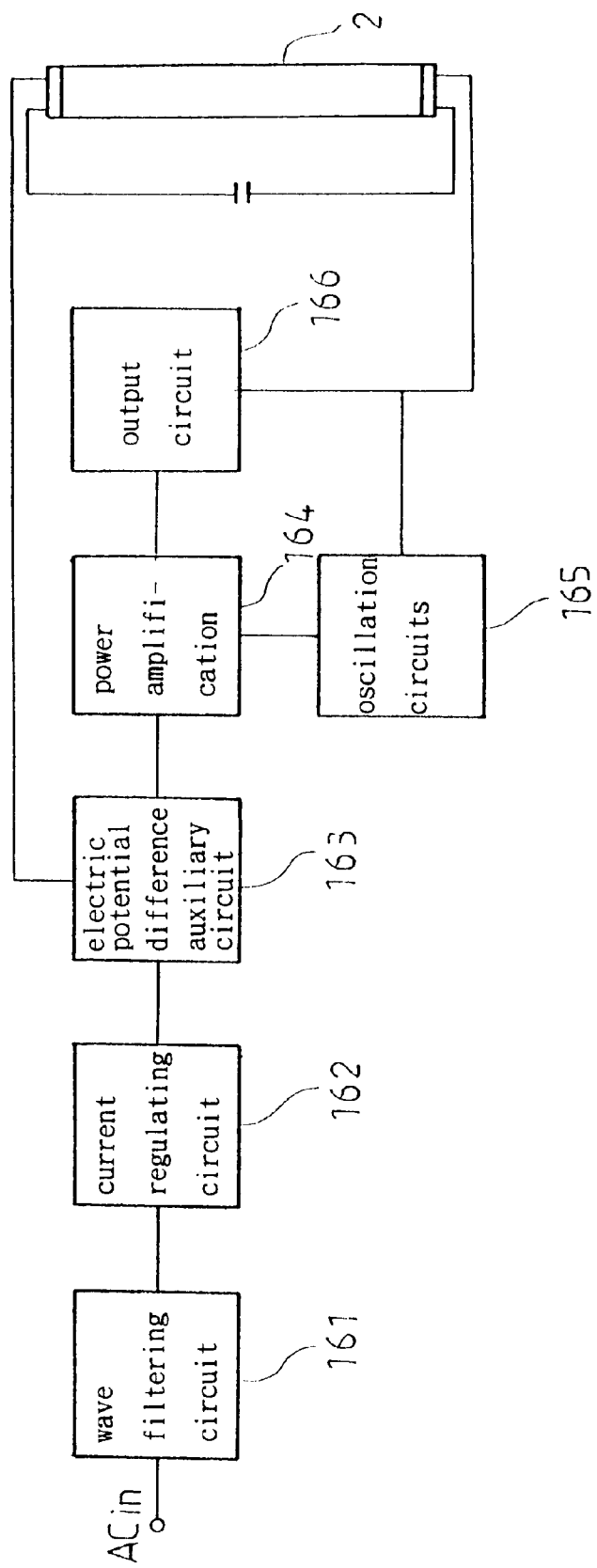
FIG. 6 is a block diagram of the electronic circuits of the present invention.

Referring to FIG. 6, the block diagram of the electronic circuits of the present invention, the electronic circuits (16) of the present invention comprise of a wave filtering circuit (161), a current regulating circuit (162) provided for filtering and regulating the alternating current pressure, after an electric potential difference auxiliary circuit (163) compensates the descending difference of the electric pressure, the light tube (2) is activated through the power amplification and oscillation circuits (164, 165) as well as the output circuit (166) to compose the electronic lighting effect and to enable the light tube (2) to maintain the stable lighting effect.

In summation of the foregoing sections, the present invention utilizes the connecting seats disposed with the electronic circuits and the reflecting plate provide for the guide wires of the electronic circuits to dispose through the electronic fluorescent light to change the old electrically induced fluorescent light into the electronic fluorescent light without replacing the light seat, thereby enhancing the power factor thereof and illumination so as to achieve the effect of saving the energy. The fluorescent lamp connector adapter with conversion circuit is of a practical design and truly an innovative invention, and is hereby submitted lawfully to the patent bureau for review and the granting of the commensurate patent rights.

What is claimed:

1. A fluorescent lamp connector adapter comprising:

two connecting seats, each connecting seat having front and rear casings, sockets disposed in lower portions of the front casings for the insertion of a light tube, insert seats having inverted triangular shapes mounted in upper portions of the front casings, two electric conducting terminals projecting outwardly from the rear casings and configured to engage a light seat;

an electronic circuit disposed inside each of the two connecting seats, the circuits connected with each other and further connected respectively with the sockets and the terminals of the front and the rear casings; and a reflecting plate including a hollow plate body in an inverted triangular shape, inserted into the insert seats and accommodating wires of two electronic circuits therein;

whereby the sockets are adapted to receive a fluorescent light.

* * * * *